Figure 2:
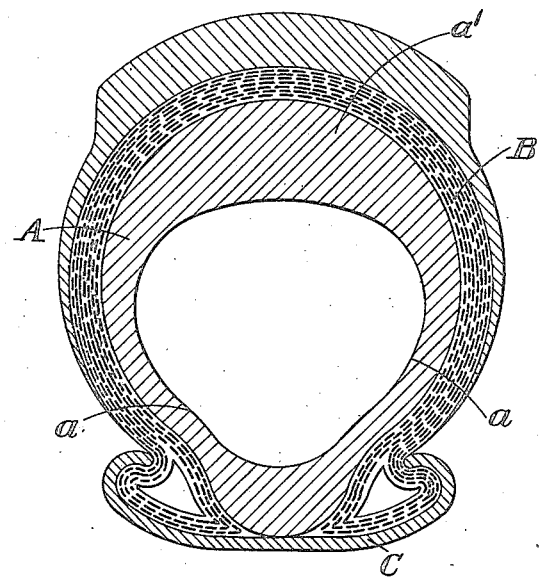

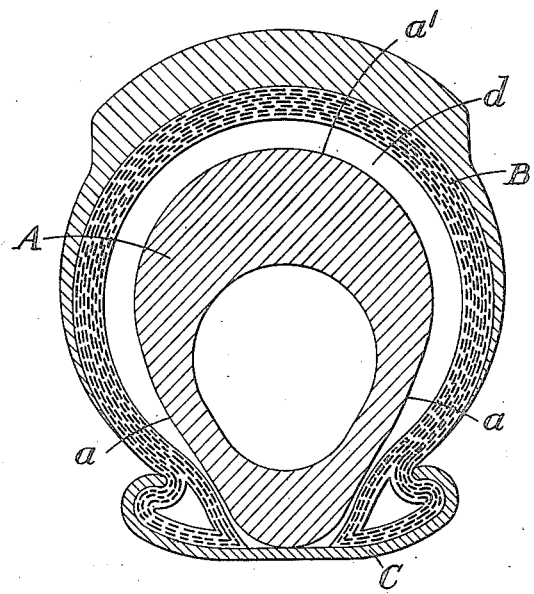
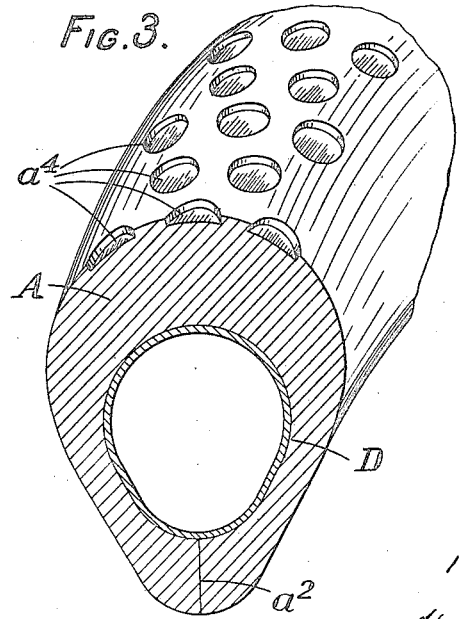

Aug. 7, 1923. 1,464,033
W. DRURY
AIR TUBE AND SHOCK ABSORBER FOR RESILIENT WHEELS FOR VEHICLES
Filed June 21, 1921  2 Sheets-Sheet 2

INVENTOR
William Drury
By Davis & Davis
Attys

Patented Aug. 7, 1923.

1,464,033

UNITED STATES PATENT OFFICE.

WILLIAM DRURY, OF HAMMERSMITH, LONDON, ENGLAND.

AIR TUBE AND SHOCK ABSORBER FOR RESILIENT WHEELS FOR VEHICLES.

Application filed June 21, 1921. Serial No. 479,285.

*To all whom it may concern:*

Be it known that WILLIAM DRURY, a subject of the King of Great Britain and Ireland, residing at 10 Lena Gardens, Shepherds Bush Road, Hammersmith, in the county of London, England, has invented certain new and useful Improvements in Air Tubes and Shock Absorbers for Resilient Wheels for Vehicles, of which the following is a specification.

This invention has relation to improvements in air tubes (and shock absorbers) for pneumatic tires for vehicle wheels and has for its object to provide a tube and shock absorber adapted to minimize punctures and to take up a certain percentage of air pressure and also the stress and strain usually borne by the ordinary tire outer casing.

An inflated but non-stretched ordinary air tube (used for any given size) when new is of similar circumference and diameter to the inside circumference and diameter of the outer cover that receives the tube, so that immediately the tube is expanded it is pressed hard and fast against the inside of the outer cover, so that if a pressure of air, say 75 lbs. to the square inch is forced into the tube the whole of this pressure is borne by the cord or fabric casing of the tire and not by the tube.

For an outer cover of a given inner diameter, I employ an inner tube of my improved construction, which, before inflation, is of smaller cross section than the interior of the outer cover, the base of the tube being of a substantial thickness and preferably shaped to fit closely to the inner surface of the beaded or other edges of the cover, while the side walls of the tube are thinner having a thickness of say about ¾ of an inch up to about the center of the height of the tire on either side, and from these points the thickness of rubber gradually increases, until the crown or tread portion of the tube will have an average thickness of, say, about 1″ to 1½″, the interior of the tube being somewhat of an oval or flat topped egg shape in cross section. For commercial vehicles motor lorries and omnibuses the tube will be of sufficient thickness at all points for the load the tire has to carry. The tube may, in some cases, be split longitudinally and beaded edges may be provided thereon to engage strengthening or connecting rings or girders as will be described. Furthermore I may provide suction cups or recesses in the outer tread portion or crown of the tube.

The tube or shock absorber to contain air or other cushioning fluid is preferably moulded somewhat pear-shaped in its cross sectional contour for beaded edge tires, and for straight sided tires the tube is moulded to approximately fit the base of the cover and rim.

The cubic capacity of this air chamber before inflation will be about one-third of the cubic capacity of an ordinary tube for a similar size tire. In order to force the tube against the inside walls and crown of the cover a considerable air pressure is required to be forced into the tube before it is sufficiently inflated to press against the sides and crown of the cover, so that the cubic capacity of the tube after it has been fully inflated to press against the sides and crown of the cover, will be increased to the extent of about two-thirds the cubic capacity of an ordinary thin inner tube. When the tube has been pressed against the sides and crown of the cover it is in a very high state of tension and very resilient, and does not lie dead or inert in the outer cover, for although an air pressure of say 75 lbs. to the square inch may be shown on the pump gauge there is really only an actual pressure of about 50 lbs. on the outer cover, the remaining 25 lbs. pressure being taken up by the tube before reaching the sides and crown of the cover. Under these conditions a tire of 135 mm. cross section will carry a working load of 1415 lbs. weight, with a pressure of 50 lbs. per square inch on the tire, the remaining 25 lbs. pressure required to carry the above weight being borne by the tube, so that although 1415 lbs. weight is carried jointly by the outer cover and tube only 50 lbs. pressure per square inch is on the walls and crown of the cover; in other words, an ordinary tire of 135 mm. cross section will have a strain of 75 lbs. air pressure against its cover to enable it to carry a working load of 1415 lbs. weight. The same cover fitted with my improved tube will only be subjected to an air pressure and strain of 50 lbs. per square inch to carry the same weight and load. This is very important as under such conditions the tire will have an increased life of some hundreds of miles, and in addition the tire does not get so hot when running under loads. The risk of puncture is very considerably reduced owing to the extra thickness of the rubber on the crown of the tube or shock absorber. For giant pneumatic tires such as are used for lorries omnibuses or the like, the tube may be made of such a thickness as may be found necessary for the load to be carried, also both laterally and longitudinally it will be of such thickness and shape that it will relieve the cover of about 25% of the internal air pressure, and act similarly to the lesser sized tubes used on motor cars of various horse power, and will also minimize the risk of puncture to these larger tires while also giving considerably increased mileage.

Figure 4:
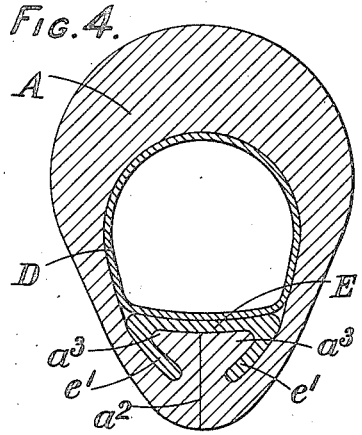
Figure 5:
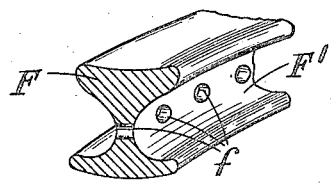

In the accompanying drawings Figure 1 shows a section through a cover with one form of my improved inner tube in position before inflation, while Figure 2 is a similar view with the inner tube fully inflated. Figures 3 and 4 show modifications and Figure 5 shows a form of metal locking ring for the edges of a circumferentially split inner tube.

In carrying this invention into effect according to one method, I build up a tube on a suitably shaped mandrel which may be annular or straight; if annular I prefer to have the mandrel formed sectionally and in such a way that the tube can be taken away from the mandrel without being damaged. When the tube has been built up or otherwise shaped as would be the case if produced by forcing the rubber through a suitably shaped die, it is then placed in a mould and pressed to its required shape and thickness; the tube with its mandrel is then taken out of the mould and the rubber split open at the base (as shown at $a^2$) in order to take out the mandrel.

It will be seen that in its unexpanded form the base of the pear-shaped tube A is approximately of the same shape as that produced by the inner walls of the edges of the tire cover B and the central part of the rim C. This similarity in shape extends about one third of the height of the tube A. From this point $a$ to the crown $a'$ on both sides, the outer periphery of the tube A lies at some appreciable distance from the corresponding inner surface of the cover B, so that there is a considerable free space $d$ (Fig. 1) between the inner tube A and the outer cover B from about the point $a$ to the point $a'$. This space may be about $\frac{1}{4}$ to about $\frac{1}{2}$ an inch according to the size of tire.

When the inner tube A is inflated the internal air pressure produced therein is not at first transmitted to the outer cover B and it is only when the expansion of the tube A is such as to cause it to come into contact with the inner surface of the outer cover that the latter is subjected to the inflation pressure. Thus if the total pressure is say 75 lbs. to the square inch, 25 lbs. may be taken up in the expansion of the inner tube and only 50 lbs. by the outer cover. These figures are merely used as an example as the proportion may in practice be different according to the size and thickness of wall of the inner tube.

The materials of the inner tube will, under inflation, stretch most at its thinnest places, i. e., at about the points $a$, $a$ while the crown will be very little expanded. The resiliency and "liveliness" of the tire will consequently be at the sides, where most required, while the comparatively unstretched crown will be better able to resist punctures than would otherwise be the case.

Instead of making the inner tube in the form of a closed tube, it may be split longitudinally, as shown at $a^2$ in Figures 3 and 4. In that case a thin rubber tube D can be placed in the split tube which is then placed in the mould for vulcanizing, and, after expansion sufficient to cause it to press against the inner surface of the tube A, and the latter to press against the inner surface of the mould is vulcanized thereto. When the tube has been sufficiently vulcanized it will be found that the thin tube has become one homogeneous part of the thicker tube and cannot be separated. Instead of using a complete inner thin rubber tube D, I may employ only a strip or a section, say a foot or so long, to carry the valve for inflation of the inner tube. The edges $a^2$ of the inner tube can be specially shaped and provided with internal locking or anchoring means to hold the edges securely together after the thin tube or lining has been inserted. An example of this construction is shown in Figure 4 wherein the inner edges $a^2$ of the tube A are provided with lips or beads $a^3$. A ring E of vulcanite, stiff rubber, or metal having corresponding flanges or projections $e'$ is then inserted—after a thin rubber tube D has been placed in the inner tube A—so that its flanges $e'$ engage with the beads $a^3$ on the inner tube, and the tube is then ready to be placed in a cover and inflated.

In another form, I simply take a band or ring of cured rubber suitably shaped and fitted with an inflating valve and place this within the split tube so as to cover the inside meeting edges thereof and then place the whole in the mould and vulcanize it to one or both edges of the tube.

Before joining up the tube at the base after having been split circumferentially, I may place in the base portion of the tube a circular girder of resistant material, such as ebonite, aluminium or other metal, in one or more sections and of suitable shape such as I shape to receive the edges of the inner tube, and provide this girder with a number of perforations in its web, so that when the tube is vulcanized and taken out of the mould it has a strong unyielding base which forms an anchorage. This construction is illustrated in Fig. 5 wherein F is the girder being perforated at $f$ in its web F'. When the tube is vulcanized the rubber runs through these perforations so that the girder is firmly locked in place. I may also provide the tread or crown portion of the tube with a suitable number of suction cups or recesses $a^4$ around its outer periphery (see Figure 3), these cups being flush with the outer periphery of the tube so that creeping to a great extent will be prevented.

What I claim and desire to secure by Letters Patent is:

1. A pneumatic tire consisting of a casing and a rim attached thereto, and an enclosed air-tight inner tube of resilient material substantially smaller in cross-section than the internal diameter of the tire-casing and having a wall of substantial thickness to render it self-sustaining, the tread and rim portions being thickened and tapered gradually into thinner side portions of the wall, whereby when said inner tube is inflated it will take up a substantial part of the internal pressure and thus materially relieve the casing of bursting pressure.

2. A pneumatic tire embodying a flexible casing and a rim attached thereto, and an enclosed air-tight inner tube made wholly of elastic material and which when uninflated is substantially smaller in diameter than the interior diameter of the casing, said inner tube having its wall of substantial thickness to render it self-sustaining, the side walls being thinner than the tread and rim portions of the wall, whereby when said inner tube is inflated it will relieve the casing materially of internal pressure and whereby, also, the greatest degree of stretch in the inner tube will occur in said thinner side walls and thereby increase their resiliency.

In testimony whereof I affix my signature in presence of two witnesses.

WILLIAM DRURY.

Witnesses:
 HAROLD DOUGLAS ELKINGTON,
 ROBERT HALLYLAYE WIELNER.